United States Patent
Peddada et al.

(10) Patent No.: US 12,418,404 B2
(45) Date of Patent: Sep. 16, 2025

(54) SECURE DATA MIGRATION

(71) Applicant: salesforce.com, inc., San Francisco, CA (US)

(72) Inventors: Prasad Peddada, Alameda, CA (US); Taher Elgamal, Atherton, CA (US)

(73) Assignee: Salesforce, Inc., San Francisco, CA (US)

( * ) Notice: Subject to any disclaimer, the term of this patent is extended or adjusted under 35 U.S.C. 154(b) by 327 days.

(21) Appl. No.: 17/649,499

(22) Filed: Jan. 31, 2022

(65) Prior Publication Data

US 2023/0246818 A1    Aug. 3, 2023

(51) Int. Cl.
*H04L 9/08* (2006.01)
*G06F 16/21* (2019.01)
*G06F 16/25* (2019.01)

(52) U.S. Cl.
CPC .......... *H04L 9/0825* (2013.01); *G06F 16/214* (2019.01); *G06F 16/258* (2019.01)

(58) Field of Classification Search
CPC . H04L 9/14; H04L 9/40; H04L 9/0825; H04L 9/0841; H04L 9/0861; H04L 63/0435; H04L 63/062; G06F 16/214; G06F 16/258
See application file for complete search history.

(56) References Cited

U.S. PATENT DOCUMENTS

| | | | |
|---|---|---|---|
| 9,626,391 B2 * | 4/2017 | Smith | G06F 16/2455 |
| 10,382,408 B1 * | 8/2019 | Ahmed | G06F 21/606 |
| 10,552,191 B2 * | 2/2020 | Chang | G06F 9/5077 |
| 11,431,481 B2 | 8/2022 | Toal | |
| 11,489,828 B2 | 11/2022 | Peddada | |
| 11,522,686 B2 | 12/2022 | Peddada | |
| 11,626,980 B2 | 4/2023 | Peddada | |
| 11,728,974 B2 | 8/2023 | Peddada | |
| 11,743,044 B2 | 8/2023 | Peddada | |
| 2004/0083281 A1 * | 4/2004 | Makagon | H04M 3/2263 709/223 |
| 2008/0148342 A1 * | 6/2008 | Aiyagari | H04L 12/462 726/1 |

(Continued)

FOREIGN PATENT DOCUMENTS

| | | | | |
|---|---|---|---|---|
| EP | 2951747 B1 * | 2/2019 | | H04L 63/0428 |
| WO | WO-2015195978 A1 * | 12/2015 | | G06Q 20/3227 |

*Primary Examiner* — Jung W Kim
*Assistant Examiner* — James P Moles
(74) *Attorney, Agent, or Firm* — Kowert, Hood, Munyon, Rankin & Goetzel, P.C.; Paul T. Seegers; Dean M. Munyon

(57) ABSTRACT

Techniques are disclosed relating to secure data migration between different data zones via a message broker system for asynchronous communication. A migration policy engine is used to determine allowable data migrations. If a data migration is permitted, a set of data in the source data zone is encrypted using a symmetric key that is generated using a key agreement protocol that utilizes a public key of a data zone key pair of a destination data zone and a private key of a migration key pair. The source data zone writes the encrypted data and a public key of the migration key pair to the message broker system. The destination data zone then reads this data from the message broker system, and decrypts the data by deriving the symmetric key using the public key of the migration key pair and a private key of the data zone key pair.

20 Claims, 9 Drawing Sheets

(56) References Cited

U.S. PATENT DOCUMENTS

| | | | |
|---|---|---|---|
| 2013/0177157 A1* | 7/2013 | Li | G06F 21/6218 |
| | | | 380/277 |
| 2013/0283056 A1* | 10/2013 | Lin | H04L 63/045 |
| | | | 713/176 |
| 2015/0304278 A1* | 10/2015 | Johnson | H04L 63/02 |
| | | | 726/11 |
| 2016/0077935 A1* | 3/2016 | Zheng | H04L 41/046 |
| | | | 714/4.12 |
| 2016/0294549 A1* | 10/2016 | Qian | H04L 9/0822 |
| 2017/0222981 A1* | 8/2017 | Srivastav | H04L 63/0428 |
| 2018/0219838 A1* | 8/2018 | Eldridge | G06F 11/3409 |
| 2020/0134223 A1* | 4/2020 | Ye | H04L 9/14 |
| 2021/0004217 A1* | 1/2021 | Halter | G06F 8/71 |
| 2022/0245125 A1* | 8/2022 | Weisman | G06F 16/2365 |
| 2022/0404787 A1* | 12/2022 | Amaro, Jr. | G05B 19/41845 |
| 2023/0131640 A1* | 4/2023 | Kushtagi | G06F 16/25 |
| | | | 707/609 |
| 2023/0171323 A1 | 6/2023 | Peddada | |

\* cited by examiner

SECURE DATA MIGRATION

BACKGROUND

Technical Field

This disclosure relates generally to data migration and, more specifically, to data migration between different data zones via a message broker system for asynchronous communication.

Description of the Related Art

Data is central to modern computer system applications, including email and file sharing, productivity applications, customer relationship management (CRM), enterprise resource planning (ERP) and databases, big data, artificial intelligence, machine learning, virtual desktops, communications, etc. Critical to the management of this ever-growing volume of data is managing the different security and legal requirements attendant to different classes of data—for example, different types or locations of data. For this reason, various "data zones" may exist within an organization, in which different policies or operations are performed. For example, data in a software development environment typically has less stringent security requirements than data in a software production environment. Similarly, data in a particular geographical region may have certain legal requirements that differ from those in other regions (e.g., privacy laws). Data centers, physical facilities that store the data that drives enterprise computing applications, can be considered one type of data zone.

The existence of data zones inevitably gives rise to the need to migrate (either moving or copying) data from one zone to another. This may occur for a variety of operational reasons, such as data redundancy, reducing data center costs, cloud deployment, etc. Similarly, data might need to change zones during the software development lifecycle, in which data moves from a development zone to a production zone. Migrations, however, must be managed in view of applicable compliance concerns, which can regulate the movement of data, particularly between different jurisdictions.

Security is of course a concern during data migrations. In some scenarios, where the data is migrated from a high-risk area (e.g., the Internet) to a low-risk area (e.g., a company's private network) a Demilitarized Zone or Demarcation Zone (DMZ) protected by a firewall, is often used as a buffer between the two areas to provide security. Such use of a DMZ frequently entails complicated firewall settings.

DETAILED DESCRIPTION

The inventors have recognized that data migrations, particularly between data centers, frequently suffer from security flaws. Current data migrations often involve one data zone opening both inbound and outbound ports while connecting to another data zone. This direct communication is frequently performed via an API. This approach can be risky, as it can result in the same ports being used to service both administrative tasks (such as the data migration) and customer traffic. This approach makes it hard to isolate and protect sensitive data, as a malicious user can access inbound ports and easily scrape data. Moreover, the data being transferred is frequently not encrypted beyond that which is provided by transport layer security (TLS).

The inventors have also recognized that the well-known practice of a data DMZ has limitations. Though a DMZ provides additional security for data migrations from high-risk areas to low-risk areas, it frequently requires complex firewall rules to mitigate risks associated with opening firewall connections. The DMZ approach is also prone to human errors.

Figure 1:
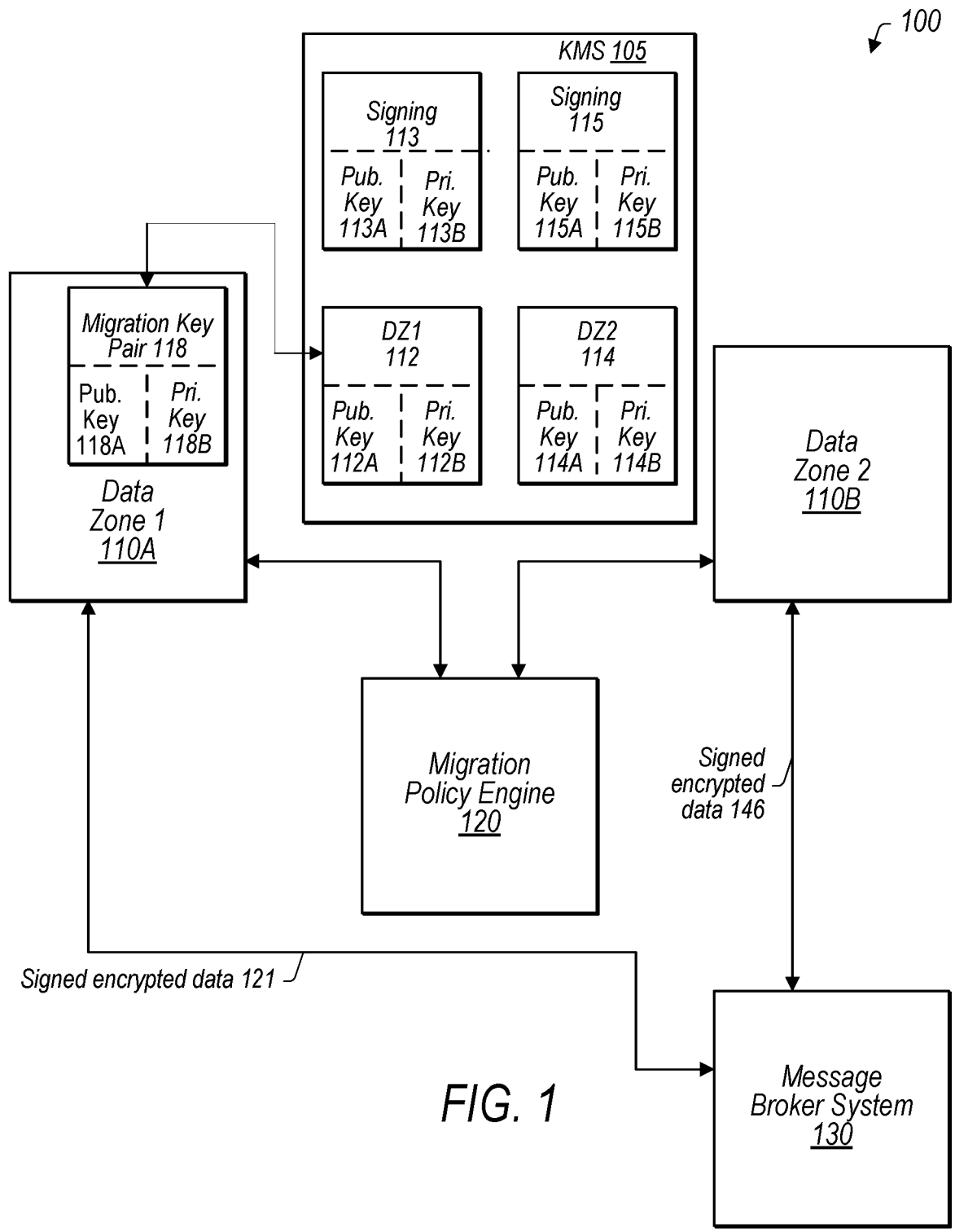
FIG. 1 is a block diagram illustrating one embodiment of a data migration system.

The present disclosure sets forth several techniques to improve the process for data migration, including with respect to security. FIG. 1 is a block diagram of one embodiment of such a system. As depicted, computer system 100 includes two data zones 110A and 110B, a key management service (KMS) 105, a migration policy engine 120, and a message broker system 130. Data zones 110A and 110B could be two different data centers, or two different code environments (development, production).

KMS 105 protects, manages, and performs operations relating to cryptographic keys. For example, KMS 105 can store keys for key owners throughout computer system 100 (e.g., data zones 110A and 110B), and perform digital signatures on behalf of these key owners. Typically, a KMS will include a hardware security module (HSM), which is a dedicated piece of hardware that includes a processor subsystem specifically designed for cryptographic operations. HSMs also typically include various physical security measures to provide a degree of tamper resistance.

FIG. 1 depicts key pairs with varying usages that are stored by KMS 105. First, KMS 105 stores asymmetric key pairs for data zone 110A (key pair 112, which includes public key 112A and private key 112B) and data zone 110B (key pair 114, which includes public key 114A and private key 114B) in order to perform a key agreement protocol. (References herein to a "key agreement protocol" also include the use of a key agreement protocol followed by a key derivation function (KDF) such as HKDF, in which the secret for KDF is the output of the key agreement.) Second, KMS 105 stores keys for performing digital signatures, including signing key pairs for data zone 110A (signing key pair 113, including signing public key 113A and signing private key 113B) and data zone 110B (signing key pair 115, including signing public key 115A and signing private key 115B). KMS 105 also stores keys for other data zones not pictured in FIG. 1. In other embodiments, the public keys may be made accessible throughout computer system 100 through means other than KMS 105.

The components of these key pairs are available to various entities within the computer system depending on the nature of the key. For example, public key 112A for data zone 110A is accessible throughout computer system 100. In contrast, private key 112B for data zone 110A is only by an entity within data zone 110A. Similarly, signing public key 113A for data zone is generally accessible, while signing private key 113B is accessible only by an entity within data zone 110A. Generally speaking, the keys stored by KMS 105 are backed by certificates issued by certificate authority (CA) and signed with the CA's private key, allowing entities to verify the authenticity of these certificates as well as the corresponding keys.

Consider an example in which a data migration is desired from data zone 110A to data zone 110B. (These data zones can be different data centers separated by a wide-area network in one example.) In one embodiment, before commencing a data migration, a computer system within data zone 110A makes a request to migration policy engine 120 to obtain approval for the migration. This request might include various parameters associated with the transfer, including the destination data zone. As will be described, engine 120 may determine based on the transfer parameters and a set of data migration rules, whether the transfer is permitted. (For example, the migration rules might allow code artifact movement from a development zone to a production zone, but prohibit data movement from a production zone to a development zone.)

Once a request is allowed, data migration can begin. As will be described, data zone 110A has an encryption service that encrypts data that is to be migrated to data zone 110B. In one embodiment, this encryption is performed by a symmetric key that is generated using a key agreement protocol in which a migration private key 118B of a migration key pair 118 of source data zone 110A is used in combination with public key 114A of destination data zone 110B, which is accessible by data zone 110A via KMS 105. (Migration key pair 118 also includes a migration public key 118A.) In one embodiment, migration key pair 118 is ephemeral, meaning that it is used for only a single cryptographic transaction and thus is not long-lived.

This approach advantageously allows the symmetric key used for each data migration to be unique. A different approach would be to use longer-lived key agreement pairs backed by KMS to generate the symmetric key in conjunction with varying additional parameters (e.g., KDF parameters). This approach can also result in unique symmetric keys for each data migration. In some embodiments, both techniques might be available. The former approach (ephemeral migration keys) could be used for the most sensitive data, while the latter approach (longer-lived migration keys with varying additional parameters) could be used for mass data movement.

Data zone 110A can then begin to encrypt data using the symmetric key. Packages (shown as signed encrypted data 121) that include the encrypted data and migration public key 118A are then signed using signing private key 113B. This process enables destination data zone 110B to be able to use signing public key 113A of data zone 110A to be able to verify that the migrated data is from data zone 110A. Data zone 110B can also decrypt the received data (shown as signed encrypted data 146) by deriving the symmetric key by performing the key agreement protocol, this time using private key 114B of data zone 110B and migration public key 118B (which is included with the data). Because private key 114B is required to derive the symmetric key, and that key is available only to an entity within data zone 110B, this ensures that the data cannot be decrypted outside data zone 110B.

As shown in FIG. 1, data zone 110A does not directly communicate with data zone 110B. Having a direct connection means that an end point is possibly being exposed to the Internet, or that potentially complex rules need to be in place to prevent a connection from the public Internet but still allow data zone communication. In general, any time there is an inbound communication port open, there is the possibility of malicious activity in addition to legitimate activity.

Instead, the communication paradigm illustrated in FIG. 1 is that each data zone communicates with an intermediate platform—message broker system 130—that allows for asynchronous communication between the data zones. APACHE KAFKA, APACHE QPID, and RABBIT MQ are common examples of message broker systems. Data zone 110A begins the transfer by authenticating to message broker system 130, and then transferring the data to be migrated to a data structure within system 130—for example, a message queue. The software effectuating this transfer within data zone 110A can do so while ensuring only outgoing ports are open for data-migration-related traffic; no data-migration-related traffic through incoming ports is permitted. Note that client traffic to and from data zone 110A is unaffected. In effect, client traffic is decoupled from the administrative traffic used for the data migration, which is configured to be outbound-only to message broker system 130.

Data zone 110B then either receives a notification from system 130 or polls system 130. If data is waiting in system 130 to be transferred to data zone 110B, data zone 110B performs the transfer after authenticating to system 130. As noted above, data zone 110B verifies the received data using signing public key 113A, and derives the symmetric key using migration public key 118A and private key 114B of data zone 110B.

This approach thus provides improved security for data migration. A migration policy engine helps enforce migration rules. A message broker system is used to facilitate asynchronous communication between data zones, such that there is no direct connection. The message broker system also allows simpler firewall rules for the data zone, since now only inbound rules are needed. Message brokers also allow bi-directional data transfer, permitting a given data zone to both send data and request data from another data zone. Since the source data zone has only outgoing ports open to the message broker system, this makes it difficult for a malicious user to extract data from the data zone. Still further, because the data is encrypted and signed, this decreases the likelihood that the data will be compromised during transport. The present disclosure, in contrast, describes an approach that utilizes key agreement to generate a unique symmetric key for each data migration.

The inventors have had the insight that when data zones (e.g., data centers) that need to exchange data have accessible public keys backed by certificates, a data migration paradigm can be employed that can rely on more than just TLS for security. The public keys (which may be based on elliptic curve (EC) cryptography) may be accessible by data zones through a variety of mechanisms. First, these public keys may be accessed through a repository such as a KMS of the system. Second, certificates for the data zones (which include public keys) may be checked into a repository. Still further, certificates for different data zones might be included in common code (e.g., an operating system) executing in each data zone.

Finally, the use of a message broker system simplifies the addition of new data zones. Suppose 100 data zones are needed to be able to transfer data between one another. Every time a new data zone is added, each of the existing data zones would need to be updated to permit communication with the new data zone. With the message broker paradigm, however, only the message broker would need to be updated to allow connections with the new data zone.

Figure 2:
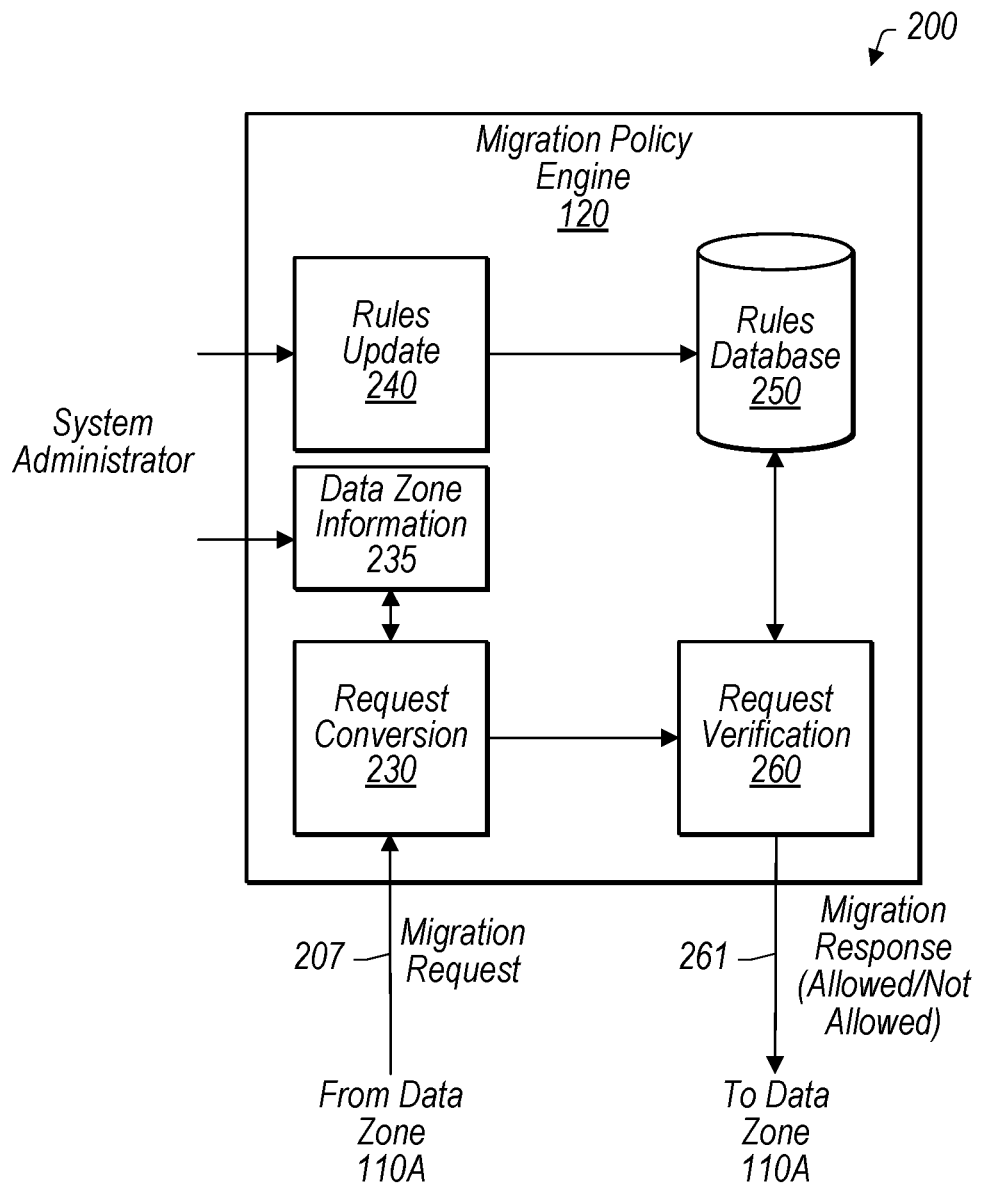
FIG. 2 is a block diagram illustrating one embodiment of a migration policy engine.

FIG. 2 is a block diagram of one embodiment of a computer system 200 that includes a migration policy engine. Throughout this disclosure, elements that are the same or similar to those previously illustrated in other Figures are numbered similarly. As shown, migration policy engine 120 includes request conversion module 230, rules update module 240, rules database 250, and request verification module 260. As will be described, these components are operable to receive a data migration request 207 from a data zone 110A, verify the request in request verification module 260 using the rules in rules database 250, and send a migration response 261 back to the data zone 110A, indicating whether the migration request is approved or not.

In one embodiment, migration request 207 includes information about the source and destination data zones, most notably identity data. Thus, migration request 207 might indicate a migration of a specified data set from data zone 110A to data zone 110B—the data zones might be specified with a data zone identifier of some sort. In some embodiments, migration request 207 might include credentials or a signed token, etc. to authorize the migration. Alternatively, migration request 207 might cause the initiation of an authorization process. In some cases, migration request 207 may include additional parameters, such as an identification of the data to be migrated, information about timing of the transfer, a work tracking identifier, etc. (Migration policy engine 120 typically will have an audit component. Each migration request to encrypt (or decrypt) can have an entry in the audit trail capturing metadata of each request, such as the user performing the request, to/from location, etc.)

In one embodiment, migration request 207 might simply specify two data zones with no further metadata about those data zones. In order to enforce certain types of migration rules such as geographical migration restrictions, migration policy engine 120 would need to have information about the desired source and destination data zones. If that information is not included in request 207, then it may be retrieved from a data store such as data zone information 235, which may be configured, for example, by a system administrator. Thus, if request 207 merely indicates a request to migrate from DC1 to DC3, data zone information 235 might store information indicating that DC1 is located in North America and DC3 is located in Europe. Data zone information 235 could also include other types of metadata as well, such as a security level of the data zone.

Request conversion module 230, in one embodiment, receives migration request 207, parses it, and retrieves relevant data from data zone information 235. This information is then provided to request verification module 260. The purpose of request verification module 260 is to evaluate information about migration request 207 (e.g., the desired source and destination data zones, as well as corresponding data from data zone information 235) relative to rules stored in rules database 250.

Rules database 250 includes a current set of migration rules, some of which are needed for compliance reasons (e.g., data privacy laws in various jurisdictions). Migration policy engine 120 may also include rules update interface 240, which allows, for example, a system administrator or other entity to keep the rules current. Rule update module 240, in various embodiments, may contain automated tools and processes to keep up with changing compliance and security regulations.

Request verification module 260, in one embodiment, evaluates the rules in rules database 250 and then determines a migration response 261. Migration response 261 is then returned to the requesting data zone. In one embodiment, migration response 261 may include an authorization that is backed by a cryptographic key. Data zone 110A may not be able to commence a data migration in one embodiment unless it receives an authorization that allows the requested data migration.

As one example of a partial set of rules in rules database 250, consider the following:

If: (src_loc=="JP") and (des_loc=="MX") then: "fail"
If: (src_loc=="AUS") and (des_loc=="CN") and (data_type==PII) then: "fail"
If: (src_loc=="IN") and (des_loc=="USA") and (tenant_id==1720) then: "fail"
If: (src_loc=="CN") then: "fail"
If: (src_type=="prod") and (des_type=="dev") then: "fail".

This list is not intended to be an actual set of rules but to illustrate the types of information that might be used to allow or prohibit a data migration. For example, the geographic location of the source and destination data zones (src_loc and des_loc, respectively) may be considered with certain combinations being disallowed (e.g., Japan to Mexico). Rules may have a combination of different rule types, such as a rule prohibiting an Australia→China migration when the data to be migrated includes personal identifiable information (PII). Another rule prohibits an India→United States migration for a particular tenant having an ID of 1720. Another rule prohibits all data transfers from China. The last rule shown prohibits data migrations from a production environment to a development environment.

In this example, the paradigm is that all rules define a condition that constitutes a prohibition on data migration. Accordingly, all rules must pass in order for the data migration to be permitted in this example. In other implementations, rules might be defined that, if satisfied, mean the migration is approved regardless of the outcome of other rules.

Figure 3A:
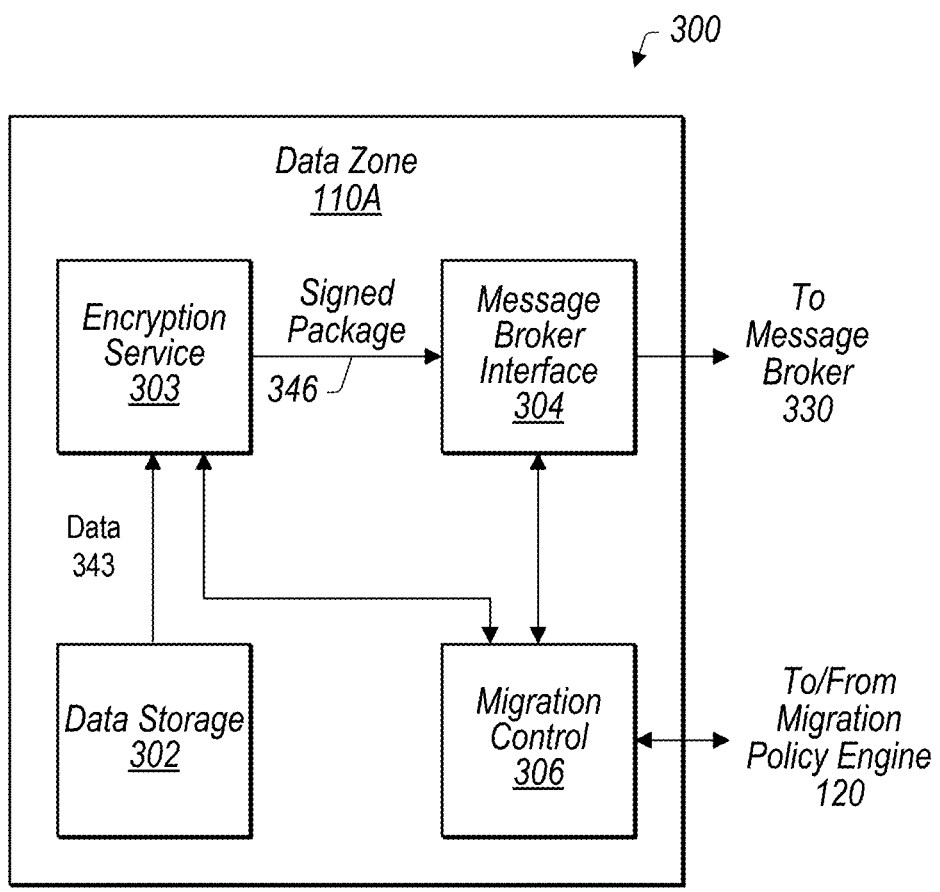
FIG. 3A is a block diagram illustrating one embodiment of elements of a data zone that is a source of a data migration.

FIG. 3A is a block diagram of one embodiment of a computer system 300 that includes a data zone. As shown, data zone 110A includes migration control module 306, data storage module 302, encryption service 303 and message broker interface 304. As will be described, these components are operable to perform various functions for initiating a data migration, including obtaining migration approvals, encrypting and signing the data to be migrated, and writing the encrypted and signed data to message broker system 330.

Migration control module 306, in various embodiments, is executable to communicate with other entities to implement data migration by controlling the flow of various other modules within data zone 110A. For example, migration control module can receive an instruction (e.g., a system user) to initiate a data migration. Module 306 can then send migration request 207 to migration policy engine 120, wherein the request is evaluated as described with reference to FIG. 2. If the request is disallowed, a message can be returned to the requester indicating that the data migration cannot proceed.

If migration policy engine 120 approves the data migration, migration control module can, in one embodiment, initiate the transfer of data from data storage module 302 to encryption service 303. Data storage module 302 is representative of any known type of data storage technology that can be utilized by data zone 110A. Module 302 can thus comprise any combination of storage area networks (SAN), network-attached storage (NAS), RAID, hard disk drives, tape drives and other forms of internal and external storage (facilities/solutions such as cloud or remote storage, etc.). In one embodiment, data zone 110A may be a data center, in which case, data storage 302 represents data storage within the data center.

Encryption service 303 is executable to encrypt data 343 from data storage 302 and output a signed package 346 that includes the encrypted data. As will be described, data 343 may be encrypted using a symmetric key that is generated using a key agreement protocol. For example, the symmetric key can be generated using 1) a public key of a key pair whose private key is accessible by the destination data zone and 2) an ephemeral private key of an ephemeral key pair generated specifically for that data by encryption service 303 in order to generate the symmetric key. The ephemeral public key of the ephemeral key pair can be sent as part of the output of service 303. Service 303 (or data zone 110A) may have a private signing key (e.g., and ECDSA private key) that is paired with a public signing key. Both keys may be backed by KMS 105, with the private signing key available only to service 303, and public signing key generally available within computer system 300. Service 303 can then sign its output with its private signing key to produce signed package 346. The destination data zone can verify package 346 using the public signing key.

Message broker interface 304 is responsible for interfacing between encryption service 303 and message broker system 330, including authentication to system 330. Interface 304 can determine when a sufficient amount of data is ready from service 303 and place that data into a format expected by message broker system 330. Interface 304 can then configure any hardware or software parameters of the network interface of data zone 110A that are needed to effectuate a data transfer. In particular, message broker interface 304 can increase the security of the data migration by opening a unidirectional connection to message broker system 330 such that there is no listen port that might be compromised by an attacker. Normal customer traffic to and from data zone 110A is kept separate from administrative traffic relating to the data migration.

Figure 3B:
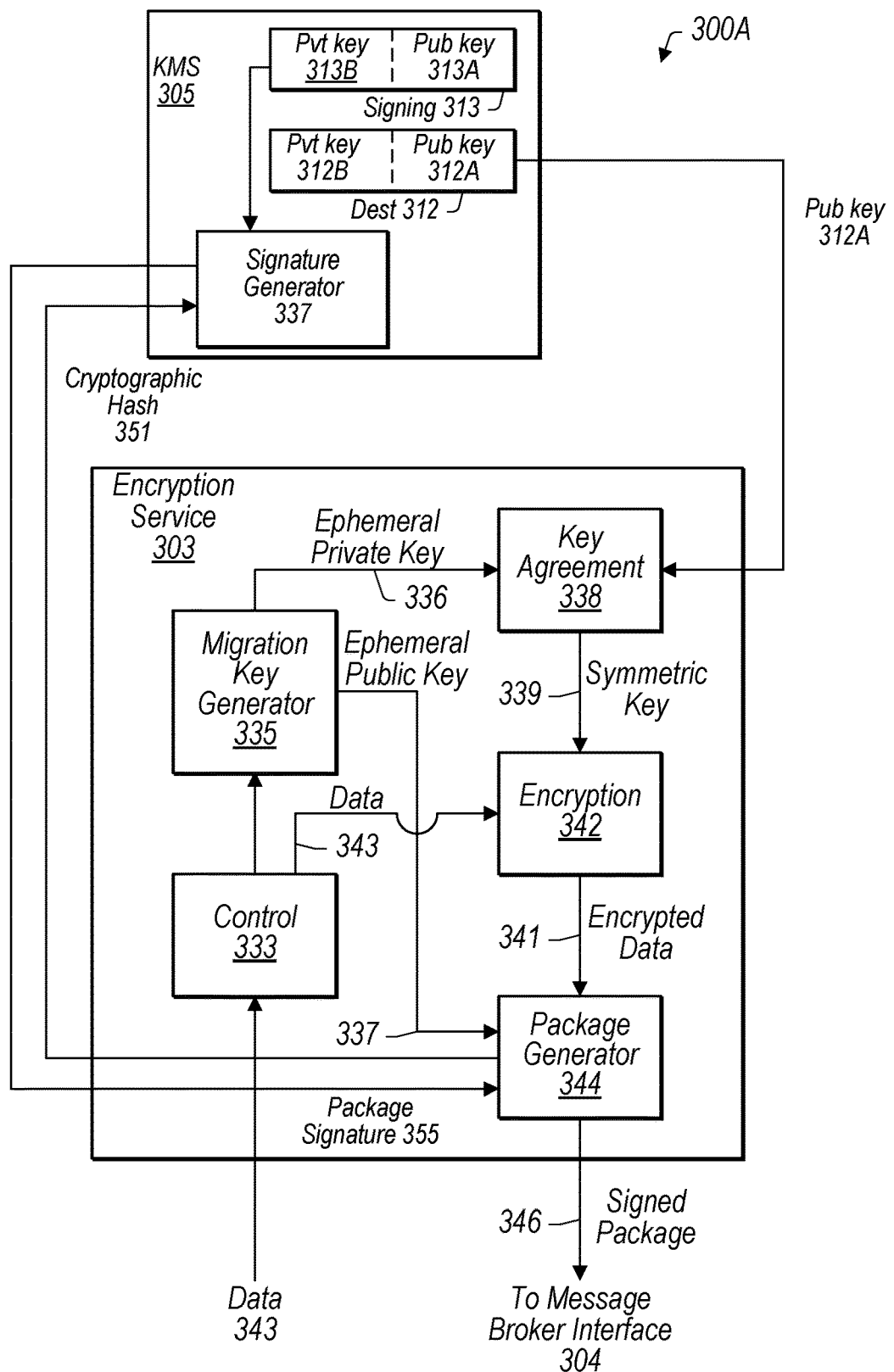
FIG. 3B is a block diagram illustrating one embodiment of an encryption service that encrypts data for a data migration.

FIG. 3B is a block diagram of one embodiment of a computer system that includes an encryption service for encrypting data to be migrated from a data zone. As shown, system 300A includes KMS 305 and encryption service 303. As will be described, computer system 300A is configured to encrypt data and sign the encrypted package in a manner such that they can be decrypted only using a key accessible within the data zone receiving the data.

KMS 305 was briefly described with reference to FIG. 1. As shown, KMS 305 stores a signing key pair 313 for encryption service 303, which includes signing public key 313A and signing private key 313B. Signature generator 337 is executable to sign data on behalf of encryption service 303 using signing private key 313B. KMS 305 also store an asymmetric key pair 312 for the destination data zone 110B. Key pair 312 includes destination public key 312A and destination private key 312B. The former key is accessible throughout computer system 300, while the latter is accessible only by an entity within destination data zone 110B.

Encryption service 303 is executable to encrypt data 343 and return a signed package 346 that includes the encrypted data 341 as well as other information. In the depicted embodiment, encryption service 303 includes various software modules, including a control module 333, an ephemeral migration key generator 335, key agreement module 338, an encryption module 342, and a signature request and package generator module 344, which provides a signed package 346 with encrypted data 341 to message broker interface 304. This division of functionality between modules can vary in other embodiments—these modules are included for explanatory purposes to illustrate one embodiment of functionality performed by encryption service 303. In one embodiment, migration control 306 is executable to instantiate encryption service 303 to run in a container.

Control module 333 is executable to control the flow of operations of encryption service 303. Control module 333 may also be responsible for reporting any error messages to migration control 306. As shown, control module 333, in response to receiving data 343 for a data migration, routes that data to encryption module 342. Control module 333 also signals ephemeral migration key generator 335 to generate an ephemeral key pair for the current data migration.

Migration key generator 335 is executable to generate an ephemeral key pair composed of an ephemeral public key 337 and an ephemeral private key 336. The key pair is "ephemeral" in that it is generated specifically for data 343 and is used for a single execution of the establishment process for symmetric key 339. In other embodiments, key agreement keys may be reused when creating symmetric key 339.

Key agreement module 338 is executable to generate symmetric key 339 utilizing a key agreement protocol. In some embodiments, the key agreement protocol may be ECDH (Elliptic Curve Diffie-Hellman Key Exchange). But any suitable key agreement protocol may be employed. As shown, module 338 receives ephemeral migration private key 336 and destination public key 312A. As noted, key agreement module 338 may perform a key derivation function in some implementations.

Encryption module 342 is executable to encrypt data 343 to produce encrypted data 341. Encryption module 342 utilizes generated symmetric key 339 to encrypt data 343 and pass the encrypted version of data 341 to package generator 344.

Package generator 344 is executable to receive encrypted data 341 and ephemeral public key 337 from the ephemeral migration key generator 335 to generate a package. Ephemeral public key 337 will be used during the decryption process to derive the symmetric key 339. Accordingly, package generator 344 includes information such as ephemeral public key 337 with encrypted data 341 in a package. Package generator 344 then takes a hash of the package to produce cryptographic hash 351, which is then sent to signature generator 337. Signature generator 337 uses signing private key 313B to sign cryptographic hash 351, thus creating package signature 355. (Signing key pair 313 may either be associated with data zone 110A or more specifically associated with encryption service 303. Signing private key 313B is only accessible within data zone 110A, and may only be accessible by encryption service 303 in some embodiments. Signing public key 313A is generally accessible.) Package signature 355 is returned to package generator 344, which appends the signature to the package that was hashed and returns the result as a signed package 346. (References to "signing a package" herein should be understood to refer to signing a hash of the contents of such a package.). Signed package 346 is then sent to message broker interface 304.

Figure 3C:
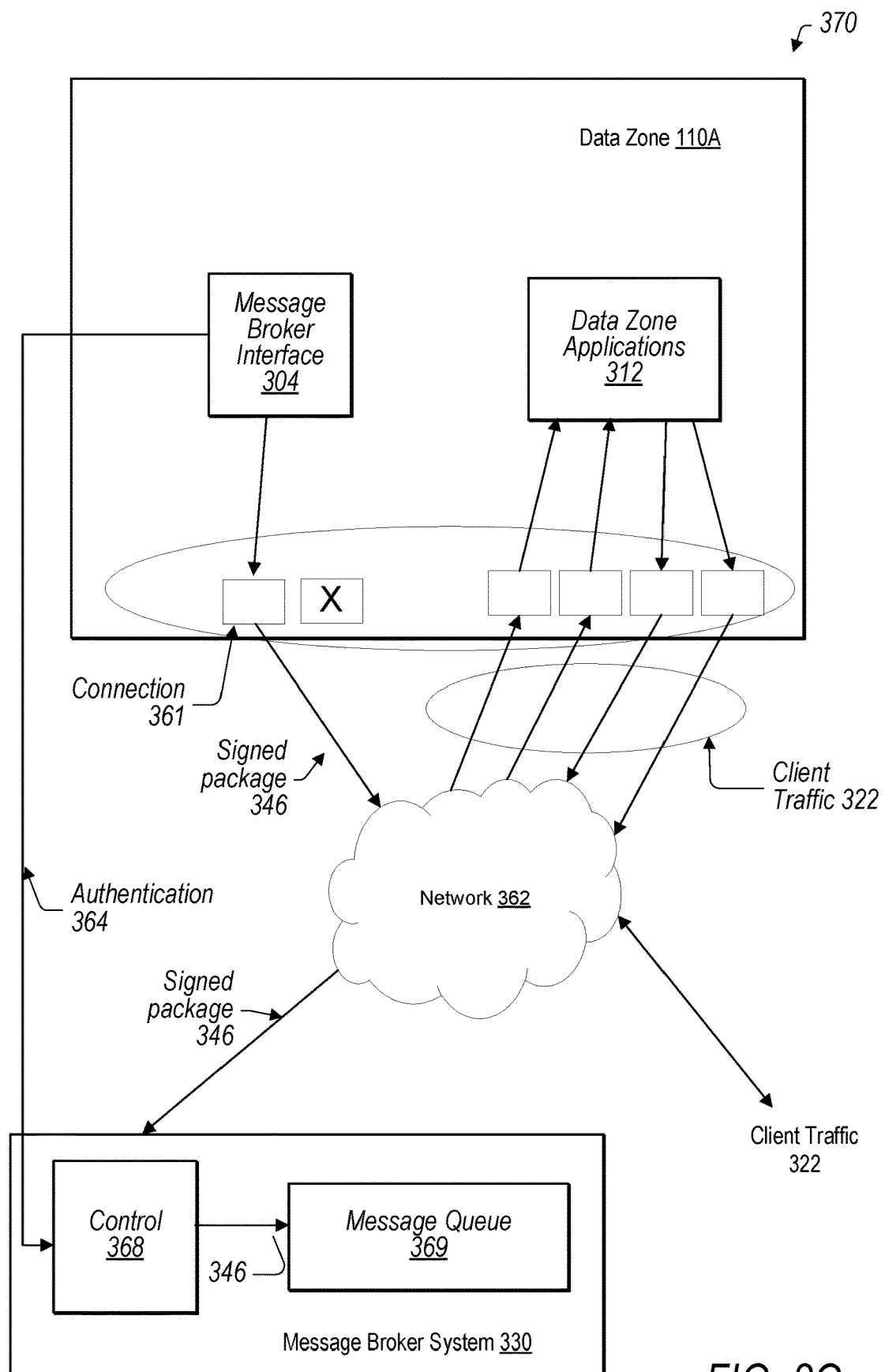
FIG. 3C is a block diagram one embodiment of a message broker interface from a source data zone to a message broker system.

FIG. 3C is a block diagram illustrating one embodiment of a computer system 370 that includes external traffic to data zone 110A, including to message broker system 330. As shown, message broker interface 304 is located within data zone 110A, and is used to communicate with message broker system 330 over computer network 362 to facilitate data migrations, represented by signed package 346. Network 362 can include the public-facing Internet. Data zone 110A also includes data zone applications 312.

Applications 312 are representative of any applications or services running within data zone 110A, such as an applications or services whose data is being migrated. For example, application 312 might be a CRM application that is receiving inbound traffic from clients, and then responding to the clients via outbound traffic. This process is represented by client traffic 322 in FIG. 3C.

As was briefly described earlier, a message broker system 330 is a middleware service that transiently stores information that allows two software entities to communicate asynchronously. In the terminology of message broker systems, a "producer" is an entity that writes to the message broker (e.g., data zone 110A), while a "consumer" is an entity that retrieves messages written to the message broker (e.g., data zone 110B). (Data zone 110A can also be a consumer in the context of a different data migration.) A message broker system typically provides sufficient functionality such that producers and consumers do not have to handle the complexity of message delivery.

One common type of communication with a message broker system is point-to-point communication, which, in its simplest form, is one producer and one consumer. This style of messaging typically uses a queue to store messages sent by the producer until they are retrieved by the consumer. The message producer sends the message to the queue; the message consumer retrieves messages from the queue.

In the depicted embodiment, message broker interface 304 is executable to receive an indication that a signed package from the encryption service is ready to be published to message broker system 330. Message broker interface 304 may have previously authenticated to message broker system 330, as shown by authentication 364. Once authentication 364 has occurred, message broker interface can establish connection 361 of data zone 110A to communicate to message broker system 330. Interface 304 configures connection 361 in such a way that communication relating to the data migration (the "administrative" or "operational" traffic) is made only via connection 361 initiated from data zone 110A. Stated another way, a unidirectional, outbound connection 361 is established for administrative traffic. Note, however, that bidirectional client traffic 322 is still taking place during the transfer. The data migration operation is not intended to interfere with this customer traffic. As indicated by the "X" shown in FIG. 3C, the data migration process does not open a listening port that might allow an attacker to gain access to resources within data zone 110A.

As shown, message broker system 330 includes a control module 368 and message queue 369. Control module 368 may be used to handle incoming and outgoing transfers (an incoming transfer is shown in FIG. 3C), as well as perform authentication. Authentication may include sending a username and password to control module 368, using mTLS, a combination thereof, or any suitable technique. Control module 368 may perform additional security checks such as IP address of the producer/consumer, etc.

Message queue 369 within message broker system 330 is representative of any type of data structure usable to store data. A database table is an example of another possible data structure within message broker system 330. Message queue 369 is intended to store data transiently. Queue 369 receives data from a producer and stores it until it is retrieved by a consumer; the data is not retained after being consumed.

Computer system 370 thus allows a data migration to be performed between two data zones without the two zones communicating directly. This is helpful in any number of settings, including when migrating data from a low-security zone (e.g., development) to a high-security zone (e.g., production). Further, the administrative traffic relating to the data migration from data zone 110A to message broker system is all outbound, making it more difficult for a malicious user to extract data from the data zone. This approach requires less complicated firewall settings as opposed to those used in a DMZ configuration.

Figure 4A:
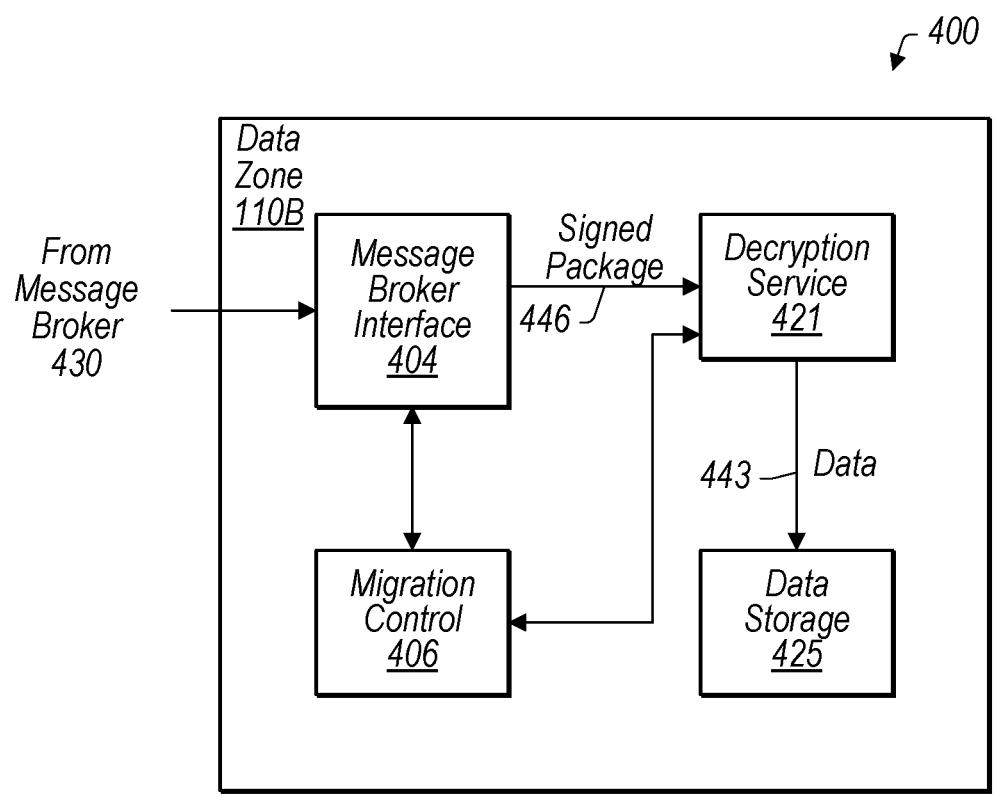
FIG. 4A is a block diagram illustrating one embodiment of elements of a data zone that is a destination of a data migration.

FIG. 4A is a block diagram of one embodiment of a data zone 110B within a computer system 400. As shown, data zone 110B includes migration control module 406, data storage module 425, decryption service 421, and message broker interface 404. The functionalities of these modules are similar to those described in reference to FIG. 3A. In general, the flow depicted in FIG. 4A is the reverse of the flow depicted in FIG. 3A.

Message broker interface 404 is responsible for interfacing between and message broker system 330 and decryption service 421. Interface 404 can determine when data destined for data zone 110B is available from message broker system 330, either by polling or by receiving a notification. Message broker interface can authenticate to message broker system 330 to initiate the transfer into data zone 110B, as will be described with reference to FIG. 4B.

Migration control module 406 is executable to communicate with other entities within data zone 110B in order to implement a data migration. For example, in response to message broker interface 404 receiving an indication that data for data zone 110B is waiting within message broker system 330 for retrieval, this information may be communicated to migration control module 406. Module 406 may, in turn, configure decryption service 421 to appropriately route the incoming data within data zone 110B after decryption. As was the case within data zone 110A, data storage 425 within data zone 110B is representative of any known type of data storage technology. In one embodiment, data zone 110B may be a data center, in which case, data storage 425 represents data storage within that data center.

As will be described with reference to FIG. 4C, decryption service 421 is first executable to verify the provenance of signed package 446. Upon package verification, decryption service 421 decrypts the encrypted version of the data in the package and stores it to data storage 425. The decryption process in decryption service 421 generally reverses the process of encryption performed by encryption service 303.

Figure 4B:
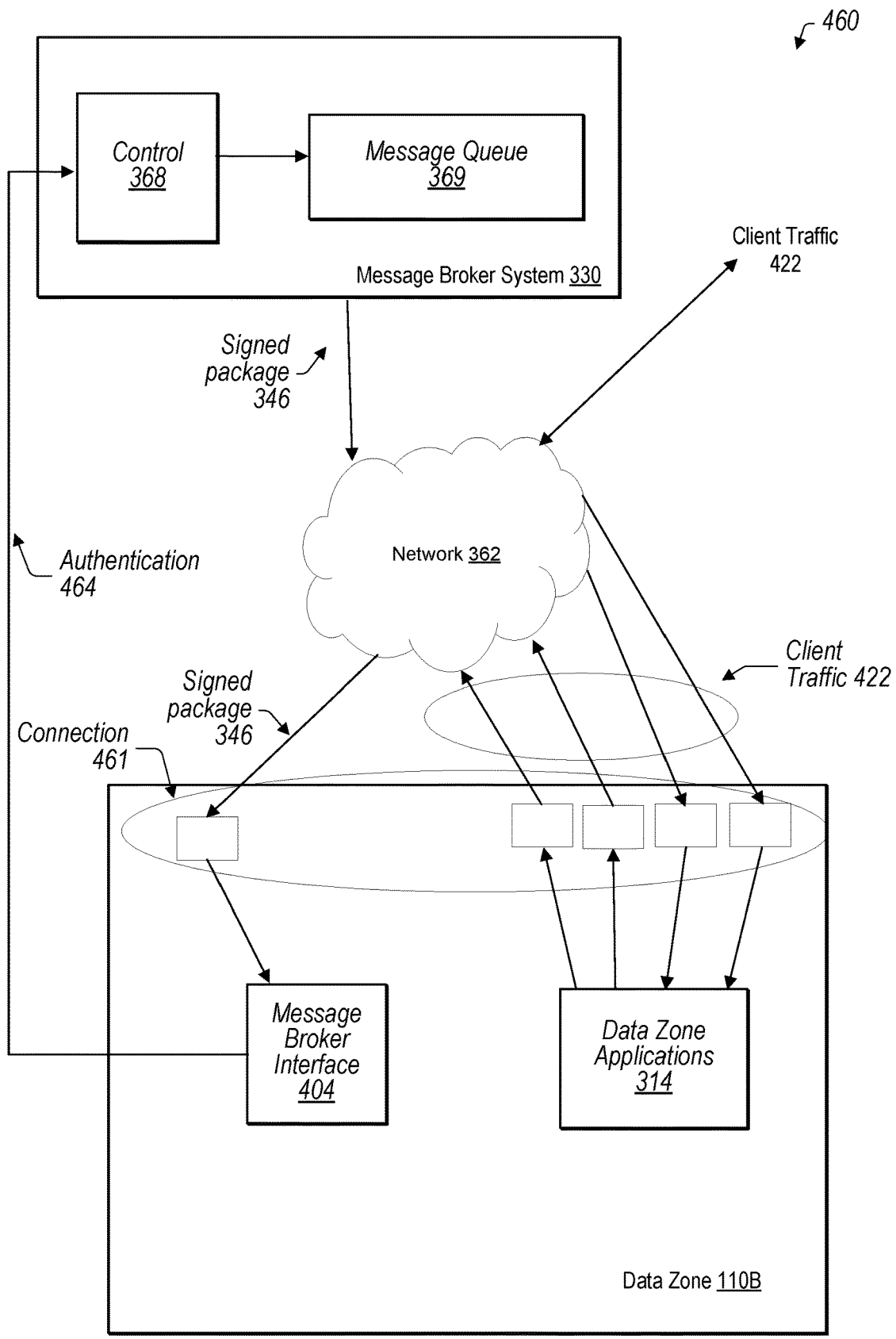
FIG. 4B is a block diagram illustrating one embodiment of a message broker interface of a destination data zone.

FIG. 4B is a block diagram of one embodiment of a computer system that includes a message broker system. As shown, system 460 includes message broker system 330 and data zone 110B, which are coupled via network 362.

Data zone 110B is the destination of the data migration, and is running data zone applications 314, which can be any applications or services performed by data zone 110B. Applications 114 may include a different instance of one of applications 312 in data zone 110A, or a different application altogether. As shown, data zone applications 314 and clients of data zone 110B communication bidirectionally, as indicated by client traffic 422.

At this point in the data migration, one more or signed packages 346 reside in message queue 369 or other data structure within message broker system 330. Message broker interface 404 can either receive an indication of these packages from control module 368, or contact control module 368 to check for data. In order to receive data, message broker interface 404 may authenticate to message broker system 330 by supplying appropriate credentials, as indicated by authentication 464. Additional security checks (e.g., IP address) may also be performed. Authentication 464 may have been performed at some earlier time prior to the migration, such as when data zone 110B was provisioned.

Upon authentication to system 330, message broker interface 404 configures a connection 461 with data zone 110B to receive inbound traffic. Based on prior communication with message broker system 330, data zone 110B may be registered as a subscriber with message broker system 330 so that message broker interface 404 can consume packages 346 destined for data zone 110B as they become available. As these packages 346 become available, message broker interface 404 will pass them to decryption service 421.

Note that message broker interface 404 can also include the functionality of message broker interface 304 (i.e., the interface can handle both incoming and outgoing transfers).

Figure 4C:
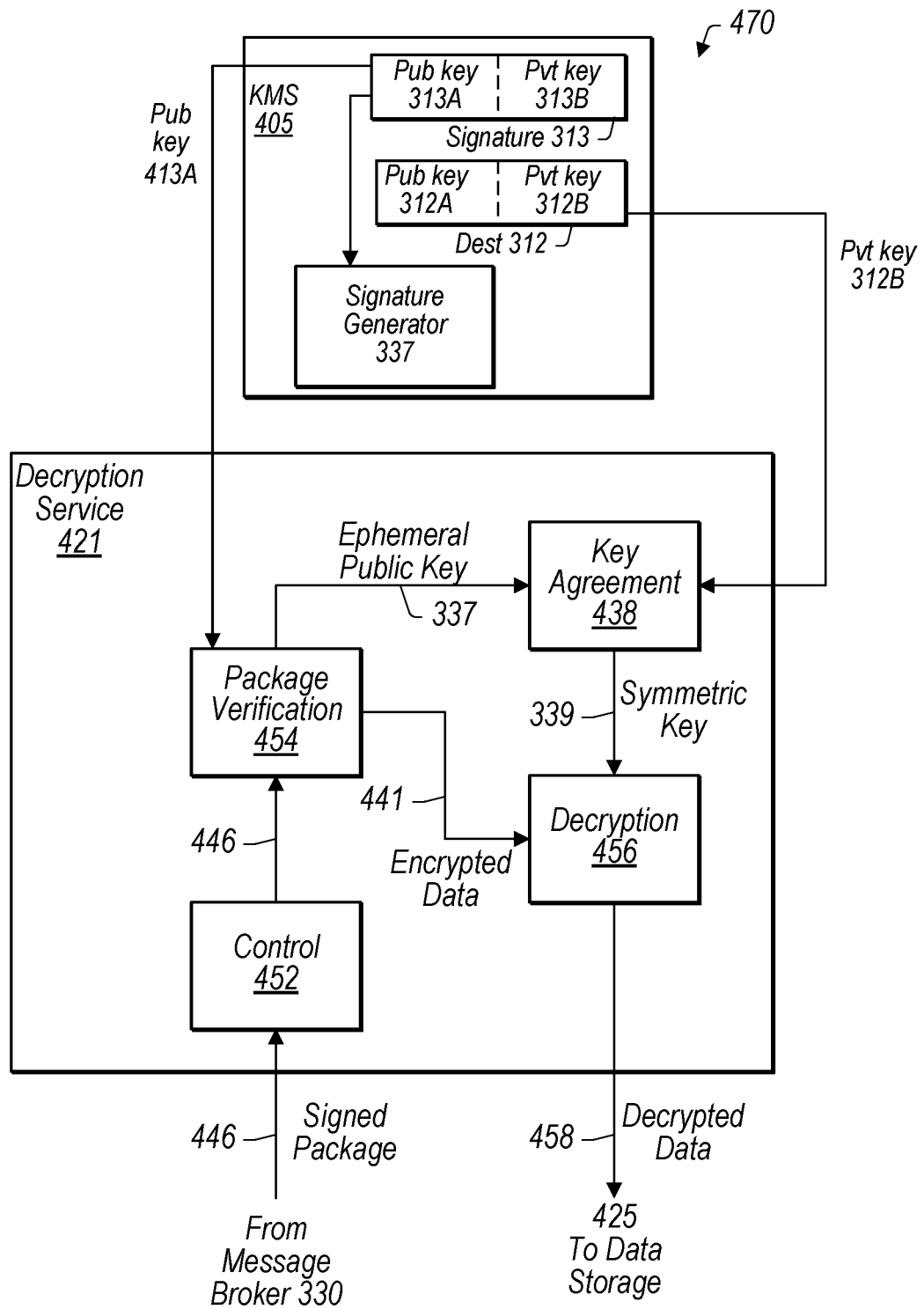
FIG. 4C is a block diagram illustrating one embodiment of a decryption service that decrypts data received as a result of a data migration.

FIG. 4C is a block diagram of an example computer system that includes a decryption service decrypting data within a destination data zone. As shown system 470 includes KMS 405 and decryption service 421. As will be described, decryption service 421 is executable to decrypt packages, originally sent by data zone 110A, that are retrieved from message broker system 330. Note that a data zone will commonly have both an encryption service and a decryption to handle both incoming and outgoing data migrations. In some implementations, both encryption and decryption might be performed by a single, multifunctional service.

KMS 405 stores various keys previously described with respect to FIG. 3B. As shown, KMS 405 stores an asymmetric key pair for data zone 110B (destination key pair 312, which includes public key 312A and private key 312B). KMS 405 also stores keys for performing digital signatures for source data zone 110A (signing key pair 313, including signing public key 313A and signing private key 313B).

Decryption service 421, is executable to decrypt package 446 (thus creating decrypted data 458) received from message broker system 330. In the depicted embodiment, decryption service 421 includes various software modules, including control module 452, package verification module 454, key agreement module 438, and decryption module 456. This division of functionality between modules can vary in other embodiments.

Control module 452 is executable to control the flow of operations of decryption service 421. Similar to control module 333 in encryption service 303, control module 452 may also be considered to be the front end of decryption service 421. Module 452 may receive signed package 446 and pass it to package verification module 454. Package 446 includes ephemeral public key 337 in addition to the encrypted data.

Package verification module 454 is executable to verify the signature of package 446 using signing public key 313A (signing private key 313B was used by encryption service 303 to sign the package). Package verification module 454 can thus ensure that only signed packages are processed by decryption service 421. Unsigned packages or packages that cannot be verified will generally be rejected by decryption service 421. After a package signature is verified, verification module 454 decapsulates package 446, separating its contents into encrypted data 441 and ephemeral public key 437 (and any other additional content).

Key agreement module 438 is executable to derive symmetric key 339 using the other halves of the key pairs used by encryption service 303 to originally generate it. (Module 438 employs the same key agreement protocol as module 338.) Where key agreement module 338 in encryption service 303 generated symmetric key 339 using ephemeral private key 336 and public key 312A of data zone 110B, key agreement module 438 derives symmetric key 339 using ephemeral public key 337 (included in the data migration) and private key 312B of data zone 110B.

Decryption module 456 is executable to use derived symmetric key 339 to decrypt encrypted data 441 to produce decrypted data 458. Decrypted data 458 may then be conveyed to data storage 425. One or more additional modules (not pictured) may route decrypted data 458 to appropriate destinations within data zone 110B as needed.

Figure 5:
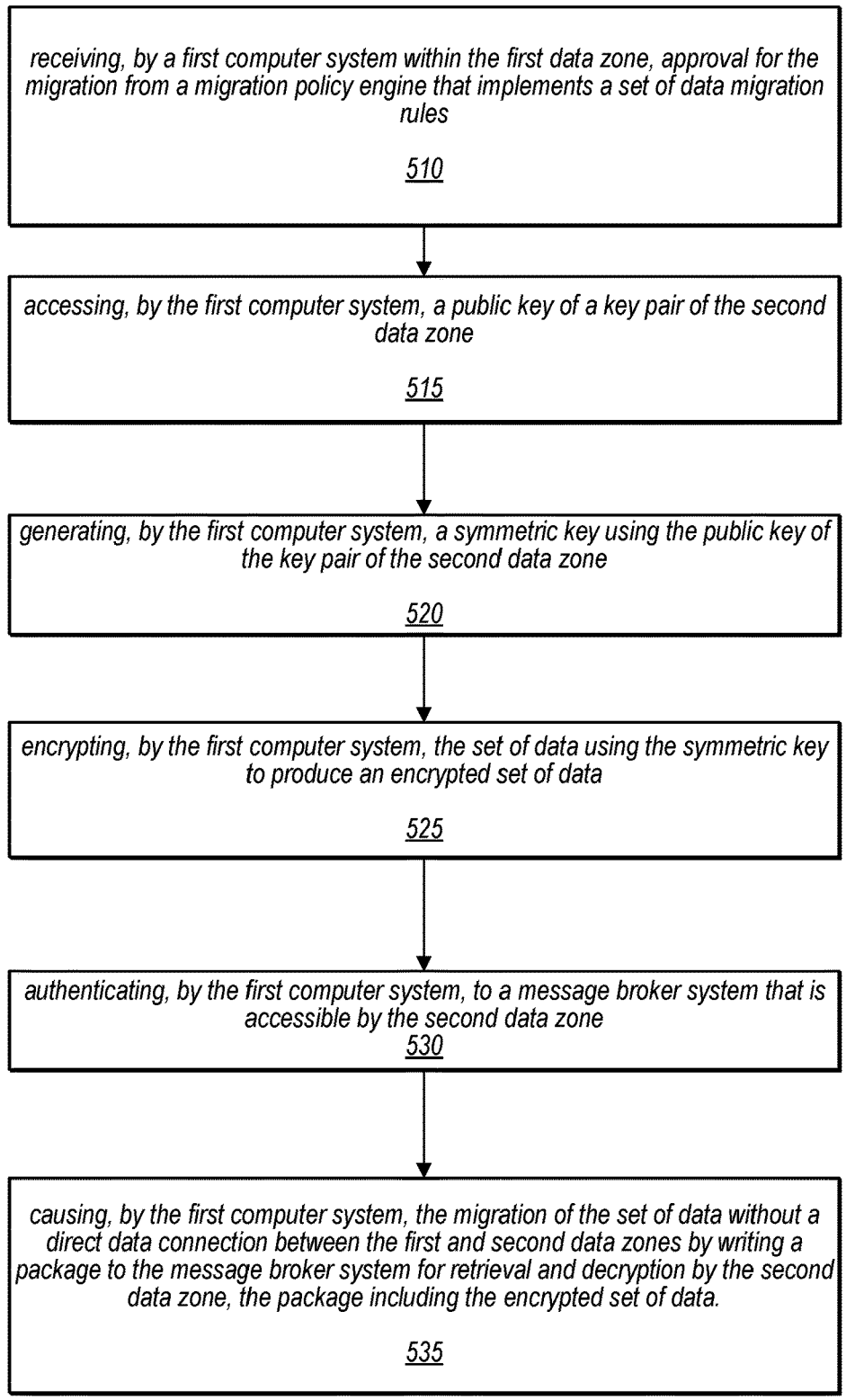
FIG. 5 is a flow diagram illustrating one embodiment of a method for performing a data migration.

FIG. 5 is a flow diagram of one embodiment of a method for migration of a set of data from a first data zone to a second data zone. In some embodiments, the data migration may be between different data centers, or between different data zones within a data center.

Method 500 begins at 510, in which a first computer system within the first data zone receives approval for the migration from a migration policy engine that implements a set of data migration rules. In 515, the first computer system accesses a public key of a key pair of the second data zone. This may be done via a key management service (KMS), for example. As another example, a certificate for the second data zone, which includes its public key, could be stored in an accessible repository. As another example, public keys of various data zones that need to communicate with one another could be included in a common operating system run by each of the data zones. In whatever manner the public key of the second data zone is obtained, the first computer system generates a symmetric key using the public key of the key pair of the second data zone in 520.

In 525, the first computer system encrypts the set of data using the symmetric key to produce an encrypted set of data. In 530, the first computer system authenticates to a message broker system that is accessible by the second data zone. Method 500 continues in 535, in which the first computer system causes the migration of the set of data without a direct data connection between the first and second data zones by writing a package including the encrypted set of data to the message broker system for retrieval and decryption by the second data zone.

Numerous modifications and additions to method 500 are contemplated and possible. For example, a migration key pair for the migration created by the first computer system may include a migration public key and a migration private key. The symmetric key may have been generated using 1) the public key of the key pair of the second data zone, and 2) the migration private key of the ephemeral key pair. In some embodiments, the migration key pair is ephemeral, and the method includes discarding the migration key after creating the package.

In various embodiments, the signed package may include the ephemeral public key of the ephemeral key pair. This form of encryption permits a decryption service within the second data zone to derive symmetric key in order to decrypt the encrypted set of data. The decryption service may derive the symmetric key using 1) the private key of the key pair of the second data zone and 2) the ephemeral public key included in the package.

With regard to the set of data migration rules in method 500, these may include various prohibitions on data migration. For example, one set of data migration rules may prohibit a migration from a production data center to a development data center. Further, the set of rules may permit a first migration between two data centers in a particular geographic region, but prohibit a second migration from a data center in the particular geographic region to another data outside the particular geographic region.

In some variations of method 500, the communication between the first data zone and the message broker system may be performed by the data migration process by opening only an outbound, unidirectional connection to the message broker system. The public key of the key pair of the second data center can be accessed by the first data zone in various ways, including via a key management system.

The various techniques described herein may be performed by one or more computer programs. The term "program" is to be construed broadly to cover a sequence of instructions in a programming language that a computing device can execute or interpret. These programs may be written in any suitable computer language, including lower-level languages such as assembly and higher-level languages such as Python.

Program instructions may be stored on a "non-transitory, computer-readable storage medium" or a "non-transitory, computer-readable medium." The storage of program instructions on such media permits execution of the program instructions by a computer system. These are broad terms intended to cover any type of computer memory or storage device that is capable of storing program instructions. The term "non-transitory," as is understood, refers to a tangible medium. Note that the program instructions may be stored on the medium in various formats (source code, compiled code, etc.).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

Note that in some cases, program instructions may be stored on a storage medium but not enabled to execute in a particular computing environment. For example, a particular computing environment (e.g., a first computer system) may have a parameter set that disables program instructions that are nonetheless resident on a storage medium of the first computer system. The recitation that these stored program instructions are "capable" of being executed is intended to account for and cover this possibility. Stated another way, program instructions stored on a computer-readable medium can be said to "executable" to perform certain functionality, whether or not current software configuration parameters permit such execution. Executability means that when and if the instructions are executed, they perform the functionality in question.

Similarly, a system that implements the methods described with respect to any of the disclosed techniques is also contemplated.

The present disclosure refers to various software operations that are performed in the context of a computer system such as that shown in FIG. 1. This computer system includes, for example, data zones 110, key management system 105, migration policy engine 120, and message broker system 130. Each of these components either constitutes physical hardware or is executed on physical hardware.

In general, any of the services or functionalities of a software development environment described in this disclosure can be performed by a host computing device, which is any computer system that is capable of connecting to a computer network. A given host computing device can be configured according to any known configuration of computer hardware. A typical hardware configuration includes a processor subsystem, memory, and one or more I/O devices coupled via an interconnect. A given host computing device may also be implemented as two or more computer systems operating together.

The processor subsystem of the host computing device may include one or more processors or processing units. In some embodiments of the host computing device, multiple instances of a processor subsystem may be coupled to the system interconnect. The processor subsystem (or each processor unit within a processor subsystem) may contain any of various processor features known in the art, such as a cache, hardware accelerator, etc.

The system memory of the host computing device is usable to store program instructions executable by the processor subsystem to cause the host computing device to perform various operations described herein. The system memory may be implemented using different physical, non-transitory memory media, such as hard disk storage, floppy disk storage, removable disk storage, flash memory, random access memory (RAM—SRAM, EDO RAM, SDRAM, DDR SDRAM, RAMBUS RAM, etc.), read-only memory (PROM, EEPROM, etc.), and so on. Memory in the host computing device is not limited to primary storage. Rather, the host computing device may also include other forms of storage such as cache memory in the processor subsystem and secondary storage in the I/O devices (e.g., a hard drive, storage array, etc.). In some embodiments, these other forms of storage may also store program instructions executable by the processor subsystem.

The interconnect of the host computing device may connect the processor subsystem and memory with various I/O devices. One possible I/O interface is a bridge chip (e.g., Southbridge) from a front-side to one or more back-side buses. Examples of I/O devices include storage devices (hard drive, optical drive, removable flash drive, storage array, SAN, or their associated controller), network interface devices (e.g., to a computer network), or other devices (e.g., graphics, user interface devices A key management system such as KMS 105 can be implemented on one or more servers, which can be on-premises, in the cloud, etc. A key management service is a system for securely storing, managing, and backing up cryptographic keys. A KMS commonly provides a web-based interface for managing keys, storage and backup of private keys, and APIs and plug-ins to integrate with other servers, systems, and software. A KMS can create secure keys that have sufficient entropy (randomness). A KMS can also provide visibility to the keys that are in use within a particular environment, even those not created in the KMS. Still further, a KMS can set key permissions, store the keys securely (such as in a hardware security module (HSM)), backup and archive keys, and perform other tasks such as automatically rotate SSH keys for increased security.

A Hardware Security Module is a physical piece of hardware that handles key storage and cryptographic functions at scale. An HSM is a secure environment that handles key lifecycle management operations and offloads many cryptographic operations as well. HSMs can be stored as online or offline devices. For example, public certificate authorities use offline HSMs to store their root CAs to keep them as secure as possible. But some companies use online HSMs to store their private PKI's intermediate CA keys.

As is understood in the art, a data center is a physical computer facility that organizations use to house their critical applications and data. A data center's design is based on a network of computing and storage resources that enable the delivery of shared applications and data.

The term "data center" is intended to cover a wide range of implementations, including traditional on-premises physical servers to virtual networks that support applications and workloads across pools of physical infrastructure and into a multi-cloud environment. In current environments, data exists and is connected across multiple data centers, the edge, and public and private clouds. A data center can frequently communicate across these multiple sites, both on-premises and in the cloud. When applications are hosted in the cloud, they are using data center resources from the cloud provider. Data centers are commonly used to support a variety of enterprise applications and activities, including, email and file sharing, productivity applications, customer relationship management (CRM), enterprise resource planning (ERP) and databases, big data, artificial intelligence, machine learning, virtual desktops, communications and collaboration services.

Data centers commonly include routers, switches, firewalls, storage systems, servers, and application delivery controllers. Because these components frequently store and manage business-critical data and applications, data center security is critical in data center design. These components operate together provide the core infrastructure for a data center: network infrastructure, storage infrastructure and computing resources. The network infrastructure connects servers (physical and virtualized), data center services, storage, and external connectivity to end-user locations. Storage systems are used to store the data that is the fuel of the data center. In contrast, applications can be considered to be the engines of a data center. Computing resources include servers that provide the processing, memory, local storage, and network connectivity that drive applications. Data centers commonly utilize additional infrastructure to support the center's hardware and software. These include power subsystems, uninterruptible power supplies (UPS), ventilation, cooling systems, fire suppression, backup generators, and connections to external networks.

Data center services are typically deployed to protect the performance and integrity of the core data center components. Data center therefore commonly use network security appliances that provide firewall and intrusion protection capabilities to safeguard the data center. Data centers also maintain application performance by providing application resiliency and availability via automatic failover and load balancing.

One standard for data center design and data center infrastructure is ANSI/TIA-942. It includes standards for ANSI/TIA-942-ready certification, which ensures compliance with one of four categories of data center tiers rated for levels of redundancy and fault tolerance. A Tier 1 (basic) data center offers limited protection against physical events. It has single-capacity components and a single, nonredundant distribution path. A Tier 2 data center offers improved protection against physical events. It has redundant-capacity components and a single, nonredundant distribution path. A Tier 3 data center protects against virtually all physical events, providing redundant-capacity components and multiple independent distribution paths. Each component can be removed or replaced without disrupting services to end users. A Tier 4 data center provides the highest levels of fault tolerance and redundancy.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure discusses potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A non-transitory, computer-readable medium storing program instructions capable of being executed within a first set of one or more computer systems within a first data center to perform operations to cause a migration of a set of data from the first data center to a second data center, the operations comprising the first set of computer systems:
    receiving, from a migration policy engine executable to implement a set of data migration rules, approval for the migration;
    accessing a public key of a key pair of the second data center from a key management system also accessible to the second data center;
    generating a symmetric key using the public key of the key pair of the second data center, wherein the symmetric key is generated such that the symmetric key is unique for each migration;
    encrypting the set of data using the symmetric key to produce an encrypted set of data;
    requesting that the key management system sign a package including the encrypted set of data;
    authenticating to a message broker system that is accessible by the second data center, wherein the authenticating includes establishing a secure connection with the message broker system; and
    causing the migration of the set of data without a direct data connection between the first and second data centers by writing the signed package to the message broker system for retrieval and decryption by the second data center, wherein the writing includes additionally encrypting the signed package for communication via the secure connection to the message broker system, and wherein writing the package to the message broker system is performed without opening an inbound connection to the first data center from the message broker system.

2. The non-transitory, computer-readable medium of claim 1, wherein the operations further comprise:
    creating, by the first set of computer systems, a migration key pair for the migration that includes a migration public key and a migration private key; and
    including, by the first set of computer systems, the migration public key of the migration key pair in the package; and
    wherein generating the symmetric key includes using 1) the public key of the key pair of the second data center, and 2) the migration private key of the migration key pair; and
    wherein deriving the symmetric key at the second data center in order to decrypt the encrypted set of data includes using 1) the private key of the key pair of the second data center, and 2) the migration public key included in the package.

3. The non-transitory, computer-readable medium of claim 2, wherein the migration key pair is ephemeral, and wherein the operations further comprise discarding the migration private key after creating the package.

4. The non-transitory, computer-readable medium of claim 1, wherein the set of data migration rules prohibits migrations from a production data center to a development data center.

5. The non-transitory, computer-readable medium of claim 1, wherein the set of data migration rules permits a first migration between two data centers in a particular geographic region, but prohibits a second migration from a data center in the particular geographic region to another data center outside the particular geographic region.

6. The non-transitory, computer-readable medium of claim 1, wherein the writing includes sending the package via one or more outbound ports from the first data center to the message broker system, wherein the one or more outbound ports are separate from inbound and outbound ports making the first data center accessible to one or more clients.

7. The non-transitory, computer-readable medium of claim 1, wherein the operations further comprise:
    instantiating a container implementing an encryption service that encrypts the set of data using the symmetric key.

8. A method for performing a migration of a set of data from a first data zone to a second data zone, the method comprising:
    receiving, by a first computer system within the first data zone, approval for the migration from a migration policy engine that implements a set of data migration rules;
    accessing, by the first computer system, a public key of a key pair of the second data zone from a key management system also accessible to the second data zone;
    generating, by the first computer system, a symmetric key using the public key of the key pair of the second data zone, wherein the symmetric key is generated such that the symmetric key is unique for each migration from the first data zone to the second data zone;
    encrypting, by the first computer system, the set of data using the symmetric key to produce an encrypted set of data;
    requesting that the key management system sign a package including the encrypted set of data;
    authenticating, by the first computer system, to a message broker system that is accessible by the second data zone, wherein the authenticating includes establishing a secure connection with the message broker system; and
    causing, by the first computer system, the migration of the set of data without a direct data connection between the first and second data zones by writing the signed package to the message broker system for retrieval and decryption by the second data zone, wherein the writing includes additionally encrypting the signed package for communication via the secure connection to the message broker system, and wherein communication between the first data zone and the message broker system is performed over one or more outbound ports between the first data zone and the message broker system without opening an inbound port from the message broker system to the first data zone.

9. The method of claim 8, further comprising:
creating, by the first computer system, an ephemeral key pair for the migration that includes an ephemeral public key and an ephemeral private key; and
including, by the first computer system, the ephemeral public key of the ephemeral key pair in the package; and
wherein the symmetric key is generated using 1) the public key of the key pair of the second data zone, and 2) the ephemeral private key of the ephemeral key pair.

10. The method of claim 9, further comprising a second computer system within the second data zone:
authenticating to the message broker system;
after the authenticating, retrieving the package from the message broker system;
deriving the symmetric key using 1) the private key of the key pair of the second data zone and 2) the ephemeral public key included in the package;
decrypting the set of data using the derived symmetric key to produce a decrypted set of data; and
storing the decrypted set of data in the second data zone.

11. The method of claim 8, wherein the set of data migration rules includes one or more rules that are evaluated based on a geographical region associated with one or both of the first and second data zones.

12. The method of claim 8, wherein the first data zone is a first data center and the second data zone is a second data center coupled to the first data zone over a wide-area network.

13. The method of claim 8, wherein the first data zone is a development zone and the second data zone is a production zone.

14. The method of claim 8,
wherein the first data zone is accessible to one or more clients via inbound and outbound ports separate from the one or more outbound ports.

15. A system, comprising:
a plurality of data centers, including a first data center and a second data center, the first data center storing a first set of data;
a second data center coupled to the first data center via a wide-area network;
a repository that stores a plurality of keys, including public and private keys for the plurality of data centers; and
a message broker system that permits asynchronous communication between a given pair of the plurality of data centers; and
wherein the first and second data centers are configured to migrate the first set of data in encrypted form from the first data center to the second data center via the message broker system without a direct data connection between the first and second data centers and without opening an inbound connection to the first data center from the message broker system;
wherein the encrypted form is encrypted using a symmetric key that is generated using a public key of the second data center obtained from the repository, wherein the symmetric key is generated such that the symmetric key is unique for each migration between the first and second data centers;
wherein the repository is configured to sign the encrypted form of the first set of data; and
wherein the first and second data centers are configured to further encrypt the signed encrypted form of the set of data when communicating via the message broker system.

16. The system of claim 15, wherein the first data center is configured to:
generate a migration-specific ephemeral key pair that includes an ephemeral public key and an ephemeral private key;
derive the symmetric key using the public key of the second data center and the ephemeral private key;
encrypt the first set of data using the symmetric key to produce an encrypted first set of data; and
write a package to the message broker system, wherein the package includes the encrypted first set of data and the ephemeral public key.

17. The system of claim 16, wherein the second data center is configured to:
retrieve the package from the message broker system;
derive the symmetric key using a private key of the second data center;
decrypt the encrypted first set of data using the derived symmetric key to produce a decrypted first set of data; and
store the decrypted first set of data in the second data center.

18. The system of claim 15, further comprising one or more computer systems implementing a migration policy engine operable to enforce a set of data migration rules for determining whether a requested migration between data centers is permitted.

19. The system of claim 15, wherein the first data center is configured to:
instantiate a container implementing an encryption service that encrypts the first set of data using the symmetric key.

20. The system of claim 15, wherein the first and second data centers are both configured to authenticate to the message broker system in order to migrate the first set of data.

* * * * *